United States Patent
Arasu et al.

(10) Patent No.: US 8,249,336 B2
(45) Date of Patent: Aug. 21, 2012

(54) LEARNING STRING TRANSFORMATIONS FROM EXAMPLES

(75) Inventors: Arvind Arasu, Redmond, WA (US); Surajit Chaudhuri, Redmond, WA (US); Shriraghav Kaushik, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 12/492,311

(22) Filed: Aug. 14, 2009

(65) Prior Publication Data
US 2011/0038531 A1 Feb. 17, 2011

(51) Int. Cl.
*G06K 9/00* (2006.01)
(52) U.S. Cl. .................................................. 382/159
(58) Field of Classification Search ............. 382/159
See application file for complete search history.

(56) References Cited

U.S. PATENT DOCUMENTS 7,406,479 B2 * 7/2008 Shriraghav et al. .................. 1/1
8,032,546 B2 * 10/2011 Arasu et al. ................... 707/769

OTHER PUBLICATIONS

Arasu et al., Incorporating String transformations in record matching, Jun. 2008.*
Arasu et al., Learning string transformation from examples, Aug. 2009.*

\* cited by examiner

*Primary Examiner* — Vikkram Bali

(57) ABSTRACT

Techniques are described to leverage a set of sample or example matched pairs of strings to learn string transformation rules, which may be used to match data records that are semantically equivalent. In one embodiment, matched pairs of input strings are accessed. For a set of matched pairs, a set of one or more string transformation rules are learned. A transformation rule may include two strings determined to be semantically equivalent. The transformation rules are used to determine whether a first and second string match each other.

18 Claims, 7 Drawing Sheets

100

| ID | table 1 | table 2 |
|---|---|---|
| C1 | Katayama,T., "A hierarchical and functional software process description and its enaction", Proc. 11th ICSE, IEEE, 1989, pp.343-352 | T. Katayama, "A hierarchical and functional software process description and its enaction," In: Proceedings of the Eleventh Int. Conf. On Soft. Eng. Pages: 343{352, IEEE Computer Society Press, Pittsburgh, PA, Jan 1989. |
| C2 | Knuth, D., The art of Computer Programming, Vol. III, Addison-Wesley, (1973). | 8. D. Knuth, The art of Computer Programming, Volume 3: Sorting and Searching, Addison-Wesley, Reading, MA, 1973. |
| C3 | [ESWARAN76] Eswaran, K. P., J. N. Gray, R. A. Lorie, I. L. Traiger, "The notions of consistency and predicate locks in a database system", Communications of the ACM, Vol. 19, No. 11, November, 76 | [14] K. P. Eswaran, J. N. Gray, R. A. Lorie, and I. L. Traiger, "The notions of consistency and predicate locks in a database system," Commun. Assoc. Comput. Mach., Vol. 19, No. 11, Nov. 1976 |

102

| co → company | indep → independent | st → saint | |
|---|---|---|---|
| corp → corporation | assoc → associates | sch → school | univ → university |
| inc → incorporated | assoc → association | cmt → community | n w → northwest |
| dist → district | ltd → limited | tech → technology | hosp → hospital |
| ctr → center | dept → department | PA → pennsylvania | intl → international |
| mfg → manufacturing | cond → conditioning | bros → brothers | a c → a/c |

| ID | Left | Right |
|---|---|---|
| E1 | 60460 Highway 50 Olathe CO | 60460 Hwy 50 Olathe CO |
| E2 | 60460 Highway 50 (PO Box 2239) Olathe | 60460 Hwy 50 Olathe CO |
| E3 | 599 N E 83rd St Redmond WA | 599 Northeast 83rd St Redmond |
| E4 | 1932 Univ Ave Madison WI | 1932 University Ave Madison WI |

FIG. 3

| Id | Left | Right |
|---|---|---|
| 1 | $A\ B\ C\ D$ | $A\ x\ b\ C\ d$ |
| 2 | $E\ B\ F\ G$ | $E\ F\ G\ b$ |
| 3 | $A\ B\ F\ D$ | $A\ b\ F\ d$ |

180

| $i$ | $A_i$ | $C_i$ |
|---|---|---|
| 1 | $A \to A,\ C \to C$ | $B \to x,\ B \to b,\ B \to d,\ B \to x\,b,\ D \to x,\ D \to b,\ D \to d,\ D \to x\,b$ |
| 2 | $E \to E,\ F \to F,\ G \to G$ | $B \to b$ |
| 3 | $A \to A,\ F \to F$ | $B \to b,\ B \to d,\ D \to b,\ D \to d$ |

LEARNING STRING TRANSFORMATIONS FROM EXAMPLES

BACKGROUND

"Robert" and "Bob" refer to the same first name but are textually dissimilar. Traditional string similarity functions do not allow a flexible way to account for such synonyms, abbreviations, aliases, and other semantic equivalencies. String transformations are mappings from one string to another, for example, "Robert"→"Bob". Identifying an appropriate set of transformations is challenging as the number of possible transformations is usually large. Techniques related to leveraging known examples of matched strings to learn string transformations are described below.

SUMMARY

The following summary is included only to introduce some concepts discussed in the Detailed Description below. This summary is not comprehensive and is not intended to delineate the scope of the claimed subject matter, which is set forth by the claims presented at the end.

Techniques are described to leverage a set of sample or example matched pairs of strings to learn string transformation rules, which may be used to match data records that are semantically equivalent. In one embodiment, matched pairs of input strings are accessed. For a set of matched pairs, a set of one or more string transformation rules are learned. A transformation rule may include two strings determined to be semantically equivalent. The transformation rules are used to determine whether a first and second string match each other.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 1 shows example matching records and a set of potential related transformations.

FIG. 3 shows an example or sample set of matching addresses.

FIG. 5 shows input examples.

DETAILED DESCRIPTION

Overview

Embodiments discussed below relate to using known examples of matched strings to learn string transformations. Conceptually, differences between example pairs are used to learn transformations, which may generate a set of transformations appropriate for a specific record matching task. An optimization problem involves learning a set of transformations that explain most of the differences. A greedy approximation algorithm for this NP-hard problem is also described.

Record Matching Overview

Record matching involves trying to match records that represent a same real-world entity. Record matching has many applications, such as data cleaning, data mining, executing searches, etc. An example of record matching is identifying a customer record in a data warehouse from the corresponding customer information such as name and address in a sales record. Due to reasons such as erroneous data entry, different formatting conventions, spelling variations, abbreviations, etc., the name and address information could be represented by different text in the two records, making the task of matching them challenging.

Most approaches to record matching have relied on textual similarity of the records. However, textual similarity can be an imperfect indicator of whether or not two records actually represent the same entity; in particular, two matching records can be textually dissimilar. Described herein are techniques for using string transformations to refer to such alternate representations. The notation X→y (e.g., Robert→Bob) will be used to denote a transformation.

Also described herein are techniques for automatically identifying suitable transformations in a record matching setting. For a real-world record matching task, hundreds of string transformations, for example, could be relevant to the matching task, and manually compiling such transformations is challenging.

Figure 2:
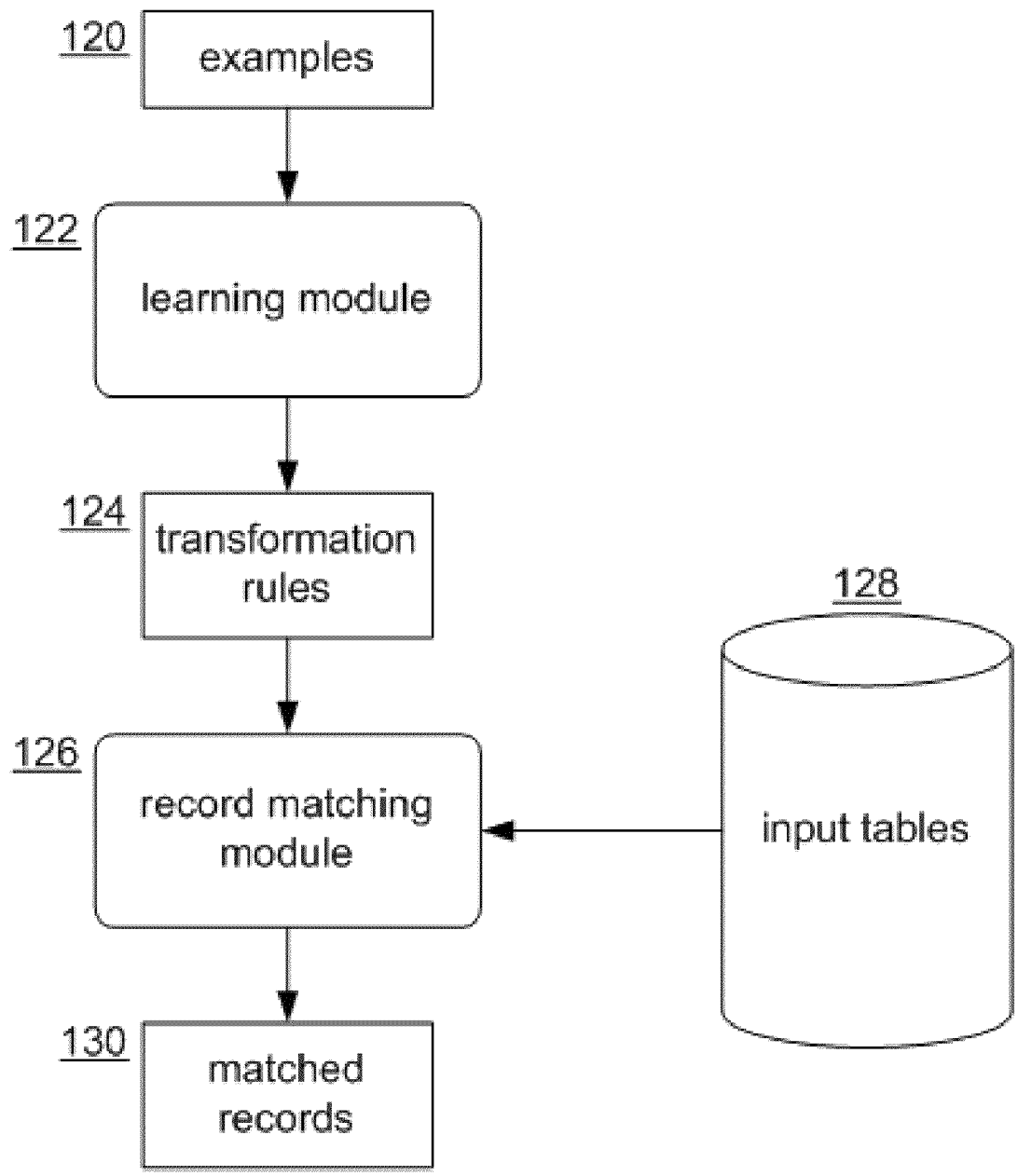
FIG. 2 shows a list of transformations.

FIG. 1 shows example matching records 100 and a set of potential related transformations 102. Consider the task of compiling a set of transformations for matching citations such as those shown in FIG. 1. A diverse set of transformations is relevant to this matching task. These include transformations encoding conference and journal abbreviations (VLDB→Very Large Data Bases), subject related abbreviations (Soft→Software), date related variations (Nov→November, and '76→1976), number related abbreviations (8th→Eighth), and a large number of variations which do not fall into any particular class (pp→pages, eds→editors). FIG. 2 shows a partial list of transformations that are relevant to matching in the domain of organization names. As is apparent, this list is a potpourri of many kinds of transformations such as state abbreviations, school related variations, and so on. Manually compiling such a list is a challenging task. Described below is an approach of learning transformations from examples of matching strings, which might be obtained in any way, such as by a user, automatically, etc. If examples are taken from the data sets that are to be matched, it is more likely that transformations relevant to the matching task at hand will be identified.

FIG. 2 shows a general process for record matching. A set of example matches 120 (pairs of matched records) are provided to a learning module 122. The learning module 122 analyzes the example matches 120 and obtains a set of text transformation rules 124. The transformation rules 124 are used by a record matching module 126 to match records in tables of a databases 28 or other source of data. The record matching module 126 outputs matched records 130 of the tables.

In general, to use machine learning to find meaningful transformation rules 124, a substantial number of matching strings or example matches 120 are analyzed to seek a concise set of syntactic rules of the form X→y that can be used to account for a large part of the textual differences between each example pair of matching strings. Informally, a rule such as Proc→Proceedings is likely to be included in such a concise set, since it should "occur" in a large number of matching strings and so can be used to account for a large portion of the differences between matching strings. On the other hand, a rule such as 11th→Int. Conf. is unlikely to be part of such a concise set since it should occur in few matching strings. In sum, an automatically computed concise set of syntactic rules (transformation rules 124) should mostly correspond to semantically meaningful transformations.

Looking ahead, a formulation of a rule learning problem presented in the section titled "TRANSFORMATION LEARNING PROBLEM" formalizes these ideas. An algorithm for solving this problem (which may serve as the learning module 122) is then presented in the section titled "RULE LEARNING ALGORITHM". The algorithm is linear in the input size which allows it to scale with the number of examples.

To discover a transformation rule 124, it may help if it appears in a sufficient number of input examples. The section titled "LEARNING TRANSFORMATIONS AT DESIGN TIME" describes a technique for finding positive examples, potentially in quantity, by leveraging the output of a basic similarity join (without transformations) over the input tables being matched. Also, the output of previous matches on the data may be used as positive examples. While some such matches may be incorrect, the learning algorithm tolerates some noise in the input matching examples.

Record Matching Context

The input to the record matching problem consists of two tables R and S. The record matching goal is to find pairs of tuples in R×S that represent the same respective real-world entities.

While in practice actual record matching implementations tend to be complex, a simplified explanation follows. The record matching process may involve into two parts—a design time part and a run time part. For the purposes herein, the run time will be assumed to be a black box (e.g., record matching module 122), as working details are described in other sources. The inputs to this black box include two tables being matched (e.g., table 1 and table 2 in FIG. 1), transformation rules), and possibly other tuning parameters. The implementation of this black box could range from something simple such as an invocation of a single similarity join operator to a more complex operator tree that for example parses columns in both inputs to extract more attributes before invoking multiple similarity join operators on different columns. Details of these types of operations may be found elsewhere.

The design time part may involve a record matching programmer figuring out the specific details to implement the run time part. Learning module 122 that learns transformations from example matches 120 may be used during design time. It should be noted that run time and design time are imprecise concepts and are used herein only as tools for explanation; embodiments described herein might occur in either or both parts. Note that the design time might involve other decisions such as which columns to match on and which similarity functions to use for each column. Again, it should be noted that once a set of transformation rules are obtained, use of same for record matching, deduplication, etc. is described in detail elsewhere.

Transformation Learning Problem

The input to the transformation learning problem—a set of N positive examples (matched pairs) will be referred to as $E^+=\{<X_i,Y_i>:i \in [1,N]\}$, where $X_i$ and $Y_i$ are matching strings from some domain such as addresses or organization names. FIG. 3 shows an example or sample set 140 of matching addresses, which will be used as a running example in this section's discussion of learning meaningful transformations.

For explanation, it will be assumed that all of the input strings are sequences of basic units called tokens, which are typically words, but may also include short phrases. For a string X, |X| denotes the number of tokens in X, X[i] denotes the ith token in X, with X[1] being the first token, X[i, j] ($1 \leq i \leq j \leq |X|$) denotes the subsequence X[i] . . . X[j]. Whitespace and punctuation serve as delimiters for tokenization and do not themselves form a part of tokens. For example, if the left string of example E2 in FIG. 3 is denoted by X, then |X|=7 and X[4, 6]=<PO, Box, 2239>.

With respect to the sought concise set of rules (that can be used to explain differences between the example matches), a rule is of the form X→y, where X and y are strings (sequences of tokens). As used herein, a rule is a purely syntactic entity whereas a transformation is a semantic concept. For example, PO Box 2239→CO is a rule but would be meaningless as a transformation. Often it will be preferable that the sought set of rules correspond, as possible, to meaningful transformations (e.g., Highway→Hwy). Informally, a rule is correct if it corresponds to meaningful transformations.

For a given pair of examples $<X_i,Y_i>$, rules may be used to relate parts of the string $X_i$ to parts of the string $Y_i$. For example, the rule Highway→Hwy can be used to relate the token Highway in the left string of E1 to the token Hwy in the right string of E1. This process, called "rule application" is formalized by the following definition.

Definition 1. A rule application over a pair of strings <X, Y> is a three tuple <x→y, i, j>, where x→y is a rule such that x=X[i, i+|x|−1] and y=Y[j, j+|y|−1]. The rule application will be said "cover" the tokens X[i], . . . X[i+|x|−1] and the tokens Y[j], . . . , Y[j+|Y|−1].

EXAMPLE 1

The rule application over E1 informally described above can be expressed as <Highway→Hwy, 2, 2>. Another example is <60460 Highway→Olathe Colo., 1, 4>. The first rule application covers two tokens, Highway and Hwy, and the second, four tokens, 60460, Highway, Olathe, and CO.

A rule application, like a rule, is a syntactic notion and a rule application can relate two strings in ways that are not semantically meaningful.

Definition 2. An alignment of a given pair of strings <X, Y> is a set of non-overlapping rule applications over <X, Y>. Two rule applications over the same pair of strings are non-overlapping if the set of tokens they cover do not overlap.

EXAMPLE 2

A possible alignment for the example pair E1 of FIG. 3 is: {<60460→60460, 1, 1>, <Highway→Hwy, 2, 2>, <50→50, 3, 3>, <Olathe→Olathe, 4, 4>, <CO→CO, 5, 5>}. Another alignment is the set: {<60460→Olathe CO, 1, 4>, <Highway→60460, 2, 1>}.

An alignment specifies how two matching strings can be related (i.e., mapped from one to the other) using multiple rule applications. An alignment is a generalization of the informal notion of matching parts and non-matching parts of two strings introduced earlier (shown in regular and underlined font, respectively, in FIG. 3). Indeed, the matching tokens (tokens in the matching parts) are those that can be related to tokens in the opposite string using identity rules (rules of the form x→x) and the non-matching tokens are those that cannot be related this way. The formal definition of alignment above generalizes the matching and non-matching idea to arbitrary rules beyond identity rules.

An alignment need not impose any ordering constraint over its rule applications. In particular, two rule applications are allowed to be part of any alignment: <x→y, i, j> and <x'→y', i', j'>, where i<i' and j>j'). The second alignment in Example 2 is an instance of such an alignment. Such alignments may be allowed because ordering of tokens is usually not rigid in record matching applications. For example, a title can appear before a set of authors in some citation records and after a set of authors in other citation records. If the definition of alignment prohibits two rule applications from covering the same tokens it might improve the quality of the set of learned transformation rules. For example, a pair of rules such as Highway→Hwy and PO Box→Hwy might be avoided.

Align(X, Y) denotes the set of possible alignments for a given pair of strings <X, Y>. The size of Align(X, Y) can be very large. Consider that if |X|=|Y|=n, then $$|Align(X, Y)| = O(2^{n^{2^n}}),$$

i.e., more than doubly exponential in the sizes of X and Y.

Using the above terminology, an overall approach can be summarized as follows: Given a set of (positive) examples of matching strings, a comparatively small set of transformation rules is sought that helps align the example strings (perhaps the most), which is quantified below using the definition of coverage. This approach implicitly prefers rules with high support, since a high-support rule can potentially contribute to the alignment of many examples.

Informally, if it is assumed that the input pairs of example strings are highly similar in practice (i.e., strings in a pair share a large fraction of their tokens), then it may be the case that a "correct" alignment of the examples would involve mostly identity rules (i.e., trivially correct rules). Based on this observation, the formal problem statement takes as input a prior collection of "known" rules as input and seeks as output a small set of new rules which, when added to the known rules, increase the alignment of example strings, perhaps the most. This formulation makes the learning problem harder and more realistic since a learning algorithm for the problem gets "credit" only for discovering new rules, not for producing trivial identity rules.

Definition 3. The "coverage" of an alignment A ∈ Align(X, Y), denoted Cov(A, X, Y), is defined as the number of tokens of X and Y covered by the rule applications in A. Formally, $$Cov(A, X, Y) \stackrel{def}{=} \sum_{<x \rightarrow y, i, j> \in A} |x| + |y|$$

Given a collection of rules R, the coverage of the collection of rules for a given pair, also denoted Cov(R, X, Y) is defined as the maximum coverage of an alignment that uses only rules in R. Formally, $$Cov(R, X, Y) \stackrel{def}{=} \max_{A: <r, i, j> \in A \Rightarrow r \in R} Cov(A, X, Y)$$

Finally, the coverage of a collection of rules R over a given set of input examples $E^+$, denoted $Cov(R, E^+)$, is defined as the sum of coverage of R for each pair of strings in $E^+$:

$$Cov(R, E^+) \stackrel{def}{=} \sum_{<X,Y> \in E^+} Cov(R, X, Y)$$

Weighted versions of the coverage definitions above are defined using a weight function w that maps tokens to non-negative real values; for a token t, w(t) denotes the weight of the token. In order to define the weighted coverages, |x| is defined to be the sum of weights of the tokens in x. Unless qualified otherwise, a reference to coverage refers to the unweighted version, not the weighted one.

EXAMPLE 3

Let $R_I$ denote the collection consisting of all possible single token identity rules, i.e., $R_I=\{x \rightarrow x:|x|=1\}$. Then the coverage of $R_I$ for the pair E1 of FIG. 3 is 8, which happens to be the coverage of the alignment {<60460→60460, 1, 1>, <50→50, 3, 3>, <Olathe→Olathe, 4, 4>, <CO→CO, 5, 5>}

Top-k Rule Learning Problem: Given a prior collection of rules $R_p$ and an input set of example matches $E^+$, identify a set of k rules $R_\delta$, $|R_\delta|=k$, that maximizes the coverage of $R_p \cup R_\delta$ over $E^+$.

It should be noted that any algorithm for learning transformation rules may be thought of informally as solving a model selection problem, which is a problem of picking the best explanation (model) for a set of data observations from among a given set of competing explanations. Informally, the set of examples are the "data," the collection of transformation rules is the "model".

Rule Learning Algorithm

This section describes algorithms and hardness results for the top-k rule learning problem, which is NP-hard, even for a simpler class of rules called unit rules, which a rule x→y with the property |x|=|y|=1 .

Figure 4:
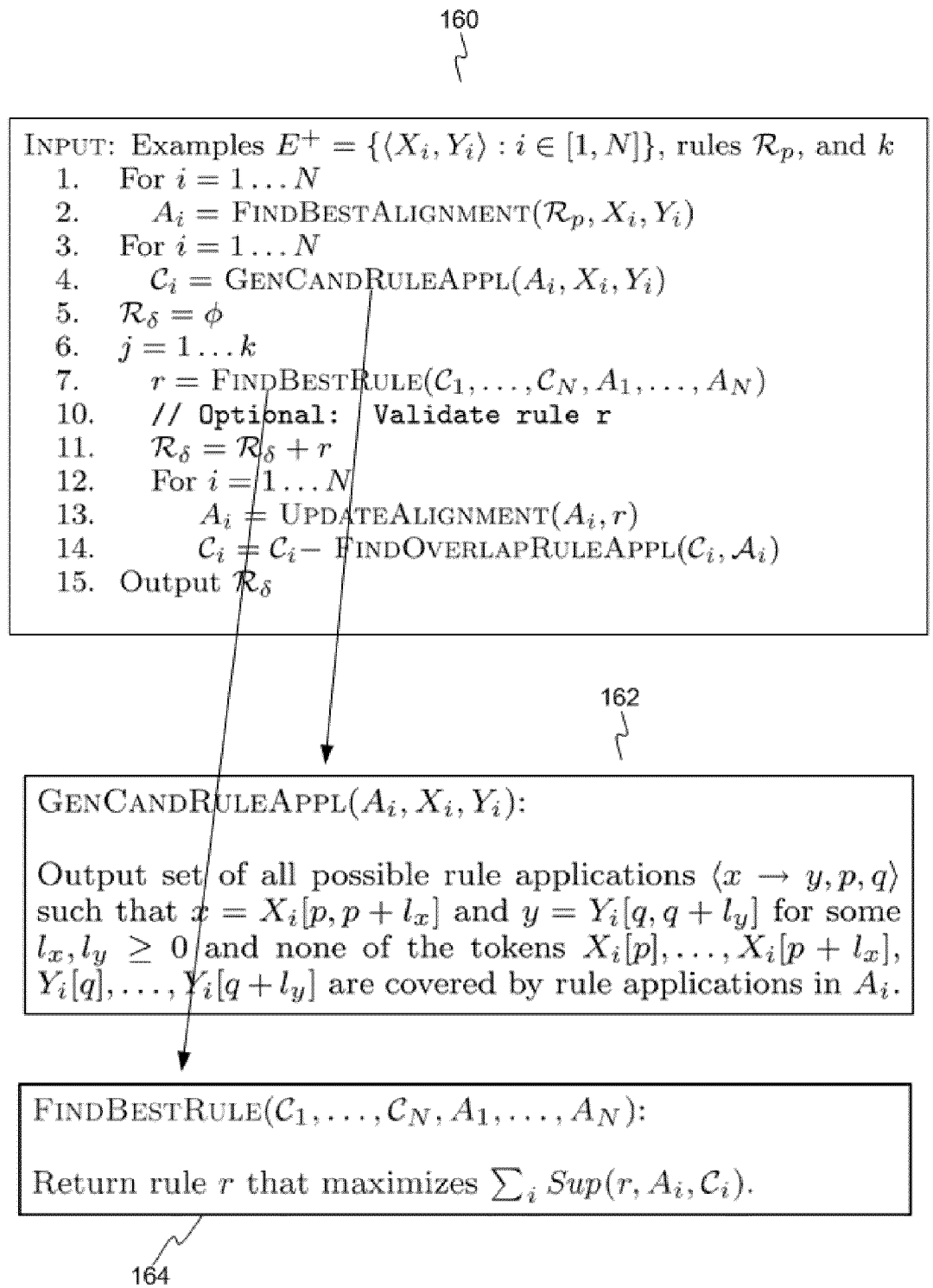
FIG. 4 shows pseudo-code for a greedy algorithm for the top-k rule learning problem.

FIG. 4 shows pseudo-code for a greedy algorithm for the top-k rule learning problem. Informally, the greedy algorithm 160 starts with an initial alignment of the input examples using prior rules alone. It then iterates k steps, and at each step picks the "best" rule that can be used to increase the alignment the most.

The algorithm 160 begins by finding an initial alignment (Steps 1-2). For each $<X_i, Y_i>$, the greedy algorithm 160 computes an alignment $A_i$ with maximum coverage (best alignment) using the prior rules $R_p$ alone. Computing this alignment is theoretically hard. However, the following method may be used.

In record matching applications, the strings $X_i$ and $Y_i$ are typically short token sequence (e.g., 5-10 tokens). This observation can be used to derive an algorithm for computing best alignment that works well in practice and handles arbitrary rules (not just unit rules). This algorithm enumerates all possible alignments (using multirules), and for each such alignment, the algorithm extends the alignment by adding unit rule applications to maximize coverage. The latter step can be done efficiently using bipartite matching (described elsewhere). The algorithm outputs the alignment with maximum coverage among all the alignments produced in the above steps. If the number of alignments involving multirules is small, which is the case when $|X_i|$ and $|Y_i|$ are small, the overall algorithm should be efficient. Also, note that finding the best alignment may be simpler if all the rules in $R_p$ are identity rules.

In steps 3-4, the algorithm 160 generates candidate rule applications. The algorithm 160 considers each alignment $A_i$ computed in steps 1-2, and generates all possible rule applications <r, p, q> that do not overlap with rules applications in $A_i$. A formal specification of the subroutine to generate candidate rule applications 162 is shown in FIG. 4. This is exactly the set of rule applications that when added to alignment $A_i$ increase the coverage of $A_i$. It can be shown that $r \notin R_p$, since otherwise $A_i$ would not be the alignment with maximum coverage. The generated rule applications are stored in the variable $C_i$. The candidate generation algorithm can be suitably changed to allow only rules from a particular class. For example, it could disallow rules with large token sequences, i.e., rules of the form x→y where |x|>L or |y|>L for some threshold L.

EXAMPLE 4

Consider example E1 of FIG. 3 and let $R_p$ denote the set of all identity rules. The best alignment of the pair of strings in E1 involving only identity rules is {<60460→60460, 1, 1>, <50→50, 3, 3>, <Olathe→Olathe, 4, 4>, <CO→CO, 5, 5ig. The only candidate rule application for this pair is <Highway→Hwy, 2, 2>. Example E2 has 10 candidate rule applications. Some example candidate rule applications are: <Highway→CO, 2, 5>, <PO Box 2239→CO, 4, 5>, and <PO Box→Hwy, 4, 2>.

In steps 6-7, the greedy algorithm 160 finds the best rule. It iteratively picks k rules. At each step, it picks the rule that increases the coverage of the current alignment $(A_1, \ldots, A_N)$ the most. The "support" of a rule $r \in C_i$ for a given alignment $A_i$ of $<X_i, Y_i>$, denoted $Sup(r, C_i, A_i)$ to be the maximum increase in alignment coverage that can be achieved by adding rule applications involving only r. Formally, $Sup(r, C_i, A_i)$ is defined as $\max_{\Delta r_i}(Cov(Ai \cup \Delta r_i) - Cov(A_i))$, where $A \cup \Delta r_i$ is a valid alignment and $\Delta r_i$ is a set of rule applications $\in C_i$ involving only rule r. The subroutine FindBestRule 164 returns the rule with the maximum support across all input examples.

In steps 13-14, algorithm 160 updates alignments and candidate rule applications. After picking each rule r in step 7, the greedy algorithm 160 updates in step 13 the current set of alignments $A_1, \ldots, A_N$ by adding the maximum number of rule applications involving r. Note that the increase in the coverage of all these alignments is exactly identical, by definition, to the sum of support of the rule r computed in the previous invocation of FindBestRule.

Finally, in step 14, the algorithm 160 updates the current set of candidate rule applications $C_1, \ldots, C_N$ by removing rule applications that overlap with the current alignments $A_1, \ldots, A_N$. These are the rule applications that overlap with the rule applications involving r that were added in the immediately preceding Step 8.

EXAMPLE 5

Figure 6:
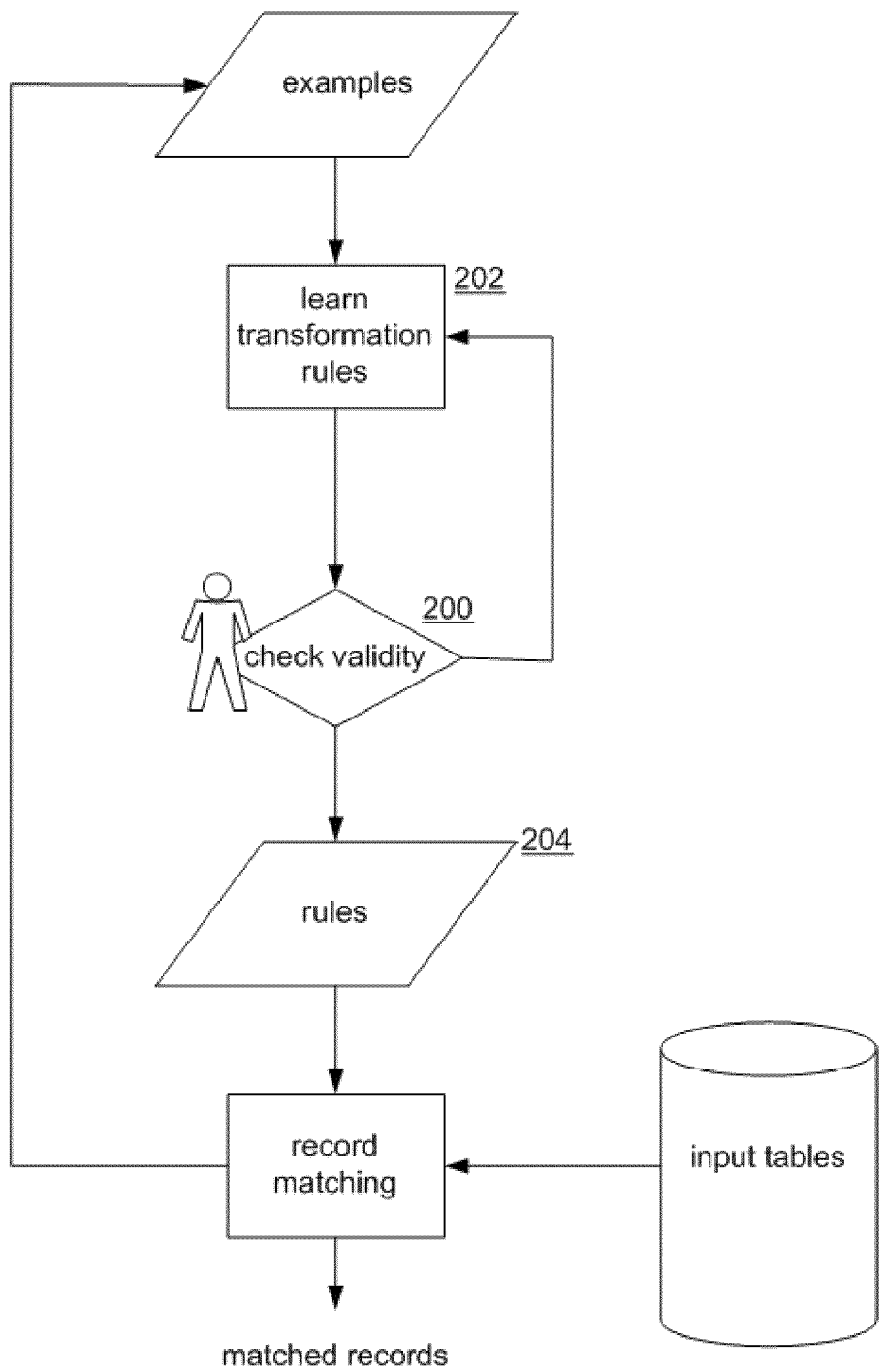
FIG. 6 shows rules.

FIG. 5 shows input examples 180. FIG. 6 shows rules 182. The execution of the greedy algorithm 160 will now be shown for the input examples 180 and rules 182. Let $R_p$ be the set of all identity rules. Column $A_i$ of rules 182 shows the best alignment for each input using the identity rule. Note that because there is no ambiguity, the positions p and q of a rule application are not shown. Column $C_i$ of rules 182 shows the candidate rule applications for these alignments. The best rule in the first iteration of the greedy algorithm (j=1) is B→b which has a support of 2 for each input example for a total support of 6. Column $A_i$ of rules 182 shows the updated alignments Ai after adding rule applications involving the rule B→b. Column $C_i$ of rules 182 shows the updated candidate rule applications that reflect the addition of the rule applications involving B→b. Note that any rule applications involving B or b have been removed from $C_i$ in rules 182, as compared to examples 180. The best rule in the second iteration of the algorithm is D→d which has a total support of 4. Therefore if k=2, the greedy algorithm produces the two rules B→b and D→d as output.

Record Matching

This section describes integration of transformation learning with record matching, in particular, how a learning module interfaces with the rest of a record matching process. An programmer integrating transformation learning might consider: (1) a source of examples, (2) the scale of examples needed, and (3) whether or to what extent transformations returned need to be manually reviewed before they are used in subsequent record matching.

Before addressing the issues mentioned above, transformations and similarity functions will be discussed, and in particular, how transformations may be used to enhance similarity functions. Transformations may wrap around an underlying similarity function, which can be any of the traditional similarity functions, to produce a new programmable similarity function. Transformations are used to take an input string and generate new strings. For example, under the transformations Inc→Incorporated and Dist→Distributing, the string "Performance Films Dist Inc" generates the following strings: "Performance Films Distributing Inc", "Performance Films Dist Incorporated", "Performance Films Distributing Incorporated", and the input string "Performance Films Dist Inc" itself. Given two strings, the underlying similarity function is used to compute the similarity between all pairs of strings generated from the original strings. The maximum similarity among these is the overall similarity under or according to transformations.

Consider for example the strings "Performance Films Dist Inc" and "Performance Films Distributing Inc". Their similarity under transformations is 1 since both of these strings generate the string "Performance Films Distributing Incorporated". This notion of similarity under transformations naturally leads to the concept of whether or not a given transformation contributes to the match between two strings. A transformation is said to "contribute" to the match between two strings if it was used to generate the strings that led to the highest score.

Learning Transformations and Design Time

Regarding designing a source of examples, recall that learning transformations requires example matching strings. To be able to learn a given transformation, the transformation should occur in a sufficiently large number of input matches. Therefore, to be able to learn hundreds of transformations, potentially need tens of thousands of example matches might be needed.

Because the overall approach to learning transformations is based on aggregating information across multiple examples (i.e., evaluating candidate transformations of a given example relative to the entire body of examples), a few wrong examples are unlikely to significantly affect the quality of the learned transformations. This observation implies that imprecision can be tolerated in the matching strings provided as input to the learning module, which in turn suggests the following approach to generating large number of matching examples: design a "vanilla" record matching program without any knowledge of transformations using the tools mentioned in "RECORD MATCHING CONTEXT" section. Such a record matching tool or program can be a simple approximate string join or a more sophisticated program learned using human labeling. This record matching is then performed over the input tables and the output matching records (strings) are used as input to the transformation learning module. The transformations learned by the learning module can then be used to enhance the qualitative performance of the initial record matching package (or used to design a new one).

Ways in which human input can be used to validate the transformations returned by the learning module will be described next. FIG. 6 shows a process for human review. In one embodiment, a human programmer reviews or checks 200 the validity of each rule returned by the learning module 202 and retains only those rules 204 that the programmer deems correct. Note that this review could happen one rule at a time, where if a rule is valid it is added to the prior rule collection and therefore influences the choice of the next rule. Alternately, the review could happen offline where the person chooses the rules she wants to retain from the collection returned. Even though this approach requires a review of every rule, the human effort involved is not significant. The number of rules under discussion might typically range from the hundreds to the thousands. If thoroughly reviewed, incorrect rules returned by the learning module should be pruned before they are used. Thus the rule set used during the run time is less likely to produce false matches.

Figure 7:
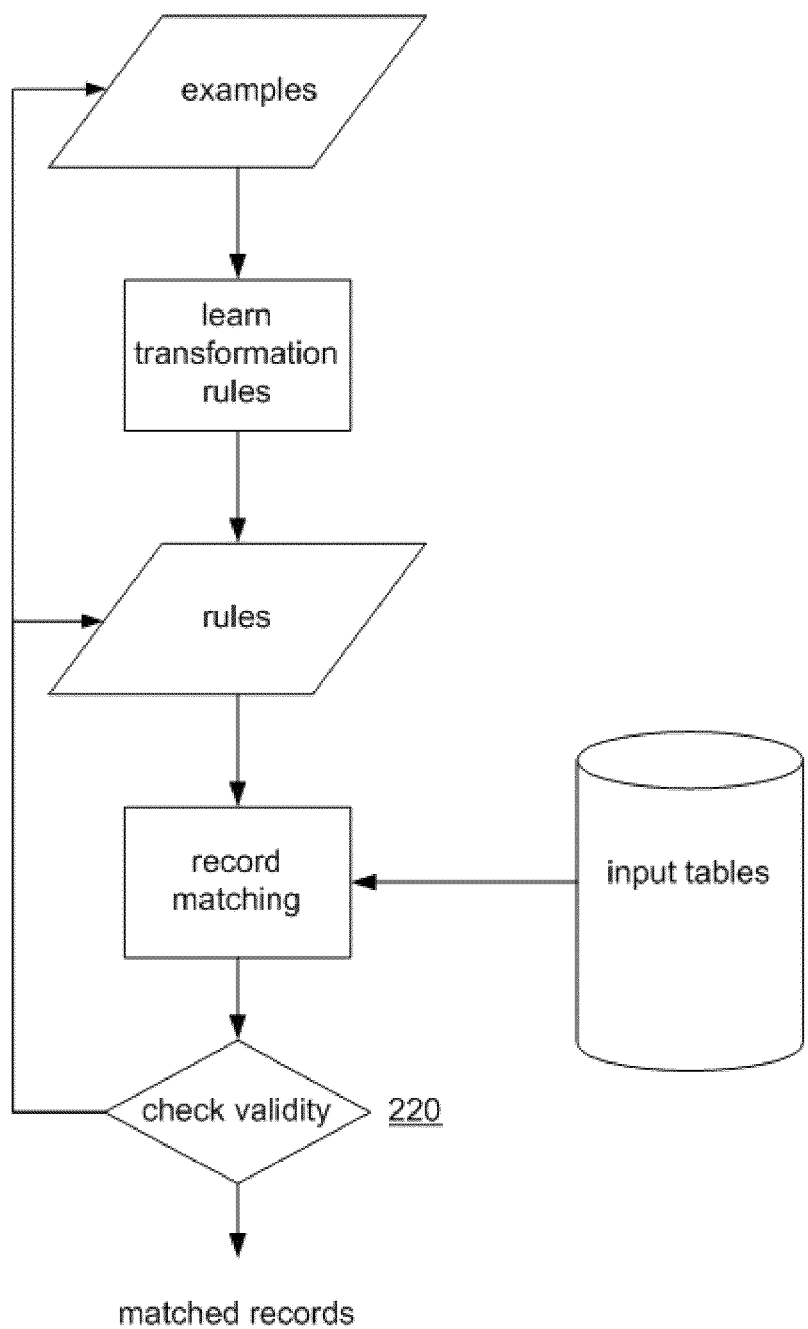
FIG. 7 shows a process for integrating learned transformations without human review.

FIG. 7 shows a process for integrating learned transformations without human review (except perhaps to review the final output of the record matching). In this embodiment, the learning system percolates the overall evaluation down into the rule set. To address the possibility that incorrect rules may stay in the system, the overall record matching quality may be evaluated 220. Based on whether or not a transformation contributes to a match, the rules that are contributing to the record matching output are tracked. If the quality (precision) of the record matching output is evaluated 220 as poor, the rules might be subjected to human review. To better focus such human review, an embodiment associates with every rule not only its coverage, but also information about how many correct and incorrect matches it contributed to.

For example, a rule that contributes to a large number of correct matches but does not contribute to even a single incorrect match can be retained without human review. In another embodiment, the rules returned are partially reviewed. With each rule returned, the corresponding coverage can be associated with the rule, and considering that the likelihood that a rule is meaningful decreases with its coverage, the reviewing person could find a suitable cut-off in terms of individual rule coverage such that rules with coverage larger than this cut-off have a desired level of precision. While this does not require an exhaustive examination of all rules returned (the precision of a rule set can be measured by random sampling), it requires more human intervention than the second approach above.

Conclusion

Embodiments and features discussed above can be realized in the form of information stored in volatile or non-volatile computer or device readable media. This is deemed to include at least media such as optical storage (e.g., CD-ROM), magnetic media, flash ROM, etc. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computer, the method comprising:
   accessing a plurality of input example matched pairs of strings, each pair comprising a first and second string representing a same real world entity, the strings being stored in memory of the computer; and
   automatically identifying, from the matched pairs, a set of string transformation rules, where a string transformation rule denotes a pair of strings that represent a same concept, the automatically identifying comprising generating a set of candidate transformation rules and using a learning algorithm to select the string transformation rules from among the candidate transformation rules.

2. A method according to claim 1, wherein the set of string transformation rules corresponds to a matched pair, and when the rules of the set are applied to one string of the matched pair, the rules transform that string to the other string of the matched pair.

3. A method according to claim 1, further comprising:
   accessing a first string and a second string stored in the memory of the computer; determining if the first string matches the second string based on the set of transformation rules by:
      applying the one or more of the transformation rules to compute strings comprising derivations of the first string;
      comparing the permutations to the second string; and
      based on the comparing, determining whether the first string matches the second string.

4. A method according to claim 3, wherein the comparing comprises applying a similarity function to measure similarity of the permutations to the second string.

5. A method according to claim 1, wherein a transformation rule is identified based on a plurality of the input examples of the matched pairs of strings.

6. A method according to claim 5, wherein candidate transformation rules are obtained from the matched pairs by comparing opposing strings in the matched pairs, and whether to include a candidate transformation rule in the set of one or more transformation rules depends on how many of the matched pairs have the candidate transformation rule.

7. One or more computer-readable storage media storing information to enable a computing device to perform a process, the process comprising:
   accessing paired input strings in memory of a computer; and
   analyzing, by the computer, the pairs of input strings as a whole to identify a set of string transformation rules, a transformation rule comprising a first string and a second string that correspond to a same concept, wherein a transformation rule for a given pair of input strings is identified based on information about a string transformation rule that corresponds to another of the pairs of input strings.

8. One of more computer-readable storage media according to claim 7, wherein the information about string transformation rules comprises or is based on a count of pairs of input strings from which the same transformation rule was derived.

9. One of more computer-readable storage media according to claim 7, wherein the set of string transformation rules is identified by using a learning algorithm to rank candidate string transformation rules derived from paired input strings.

10. One of more computer-readable storage media according to claim 9, wherein the candidate string transformations are derived from differences between paired input strings.

11. One of more computer-readable storage media according to claim 7, wherein the computing the set of string transformation rules is performed by a learning algorithm that progressively refines which transformation rules to include in the set of string transformation rules as it analyzes the pairs of input strings.

12. One of more computer-readable storage media according to claim 7, the process further comprising receiving input comprising indicia of a human evaluation of records determined to match, and using the input to automatically select a transformation rule to eliminate from the set of transformation rules.

13. One of more computer-readable storage media storing information that enables a computing device to execute a process, the process comprising:
 accessing stored input data comprising pairs of strings;
 parsing one of the pairs to identify candidate string transformation rules that correspond to differences between the strings of the pair;
 selecting candidate string transformation rules that maximize alignment of the input strings with their paired input strings; and
 storing as output the selected string transformation rules.

14. One of more computer-readable storage media according to claim 13, further comprising:
 using the stored selected string transformation rules to determine which records in a first table match records in a second table.

15. One of more computer-readable storage media according to claim 14, wherein the input data is obtained by performing a similarity join of the first table and the second table.

16. One of more computer-readable storage media according to claim 15, wherein the similarity join comprises identifying strings of the records by computing measures of similarity thereof.

17. One of more computer-readable storage media according to claim 13, wherein the selecting is performed by a greedy learning algorithm that selects a candidate transformation rule based on the number of pairs for which the candidate transformation rule contributes to a mapping that transforms an input string to its paired input string.

18. One or more computer-readable storage media according to claim 13, wherein for a substantial portion of the paired input strings a pair of input strings are semantically equivalent and do not comprise identical strings of characters.

\* \* \* \* \*